United States Patent
Green

[11] 3,992,052
[45] Nov. 16, 1976

[54] ESCAPE DOOR FOR TRAILER

[76] Inventor: William M. Green, 11278 Ford Road, Brighton, Mich. 48116

[22] Filed: Mar. 11, 1974

[21] Appl. No.: 450,003

[52] U.S. Cl. .............................. 296/28 M; 49/141; 49/279; 292/119; 296/146
[51] Int. Cl.² .......................................... B60J 9/02
[58] Field of Search............ 296/28 M, 146; 49/141, 49/276, 501, 400, 399, 379, 386, 364; 292/127, 119, 30, 53, DIG. 65, DIG. 47; 244/DIG. 2, 129 D, 137 P; 16/1

[56] References Cited
UNITED STATES PATENTS

| 37,567 | 2/1863 | Cooper | 292/127 |
|---|---|---|---|
| 279,791 | 6/1883 | Parkinson | 105/348 |
| 563,058 | 6/1896 | Peck | 16/1 C |
| 1,348,715 | 8/1920 | Grending | 292/127 |
| 1,664,576 | 4/1928 | Stuart et al. | 292/119 |
| 2,047,401 | 7/1936 | Whitted | 49/379 |
| 2,699,578 | 1/1955 | Marks | 49/399 |
| 2,767,006 | 10/1956 | Patrick | 292/127 |
| 2,793,722 | 5/1957 | Bingham | 49/141 |
| 2,871,056 | 1/1959 | Levitt | 49/501 |
| 2,948,366 | 8/1960 | Kelly et al. | 49/501 |
| 3,032,834 | 5/1962 | Carlson | 49/141 |
| 3,044,287 | 7/1962 | Pelcin | 292/127 |
| 3,120,032 | 2/1964 | Burnette | 49/141 X |
| 3,739,527 | 6/1973 | Schubach | 49/141 |

FOREIGN PATENTS OR APPLICATIONS

| 371,726 | 1939 | Italy | 292/119 |
|---|---|---|---|

*Primary Examiner*—Robert J. Spar
*Assistant Examiner*—Donald W. Underwood

[57] ABSTRACT

The side, end or floor of a house trailer is provided with an opening when being constructed or cut thereinto if completed which is closed by an escape door. The latching mechanism is constructed for rapid opening in case an occupant must hurriedly escape from the trailer interior. This may be caused by someone forcing entrance into the trailer, by fire, by failure of the trailer door to open or for any other reason where the occupant is away from the door and must leave the trailer on very short notice. The door is preferably spring pressed, hinged at the bottom and approximately seven feet long and 28 inches high. The door is latched by a releasable latching mechanism which is operated by pushing on an adjacent knob to open an area through the wall or floor of a size to permit the occupant to crawl or roll through the opening to escape from the trailer interior.

1 Claim, 4 Drawing Figures

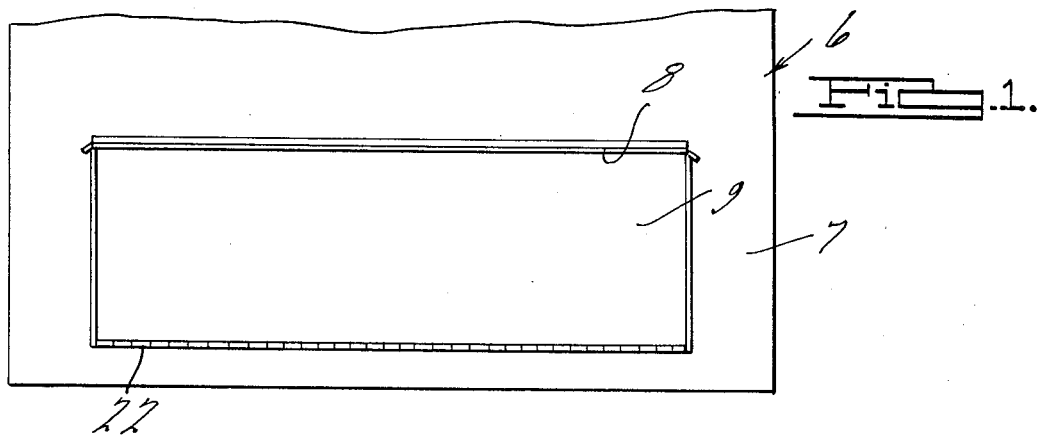
Fig. 1.
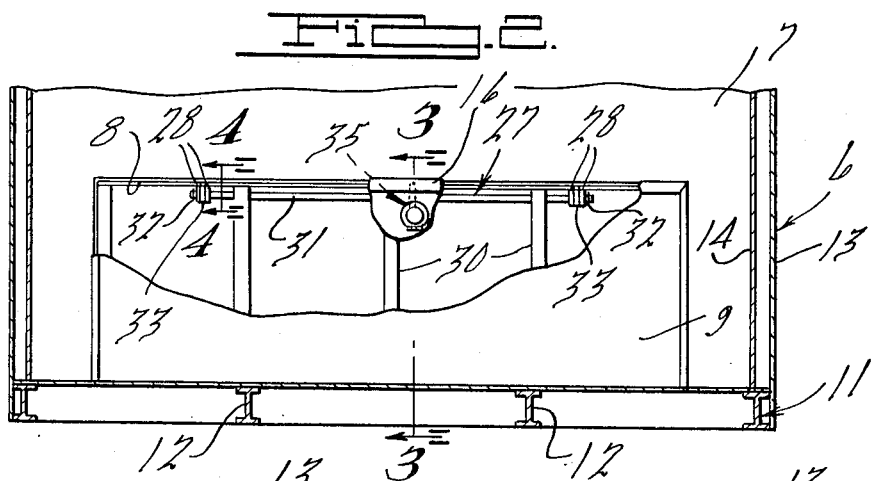
Fig. 2.
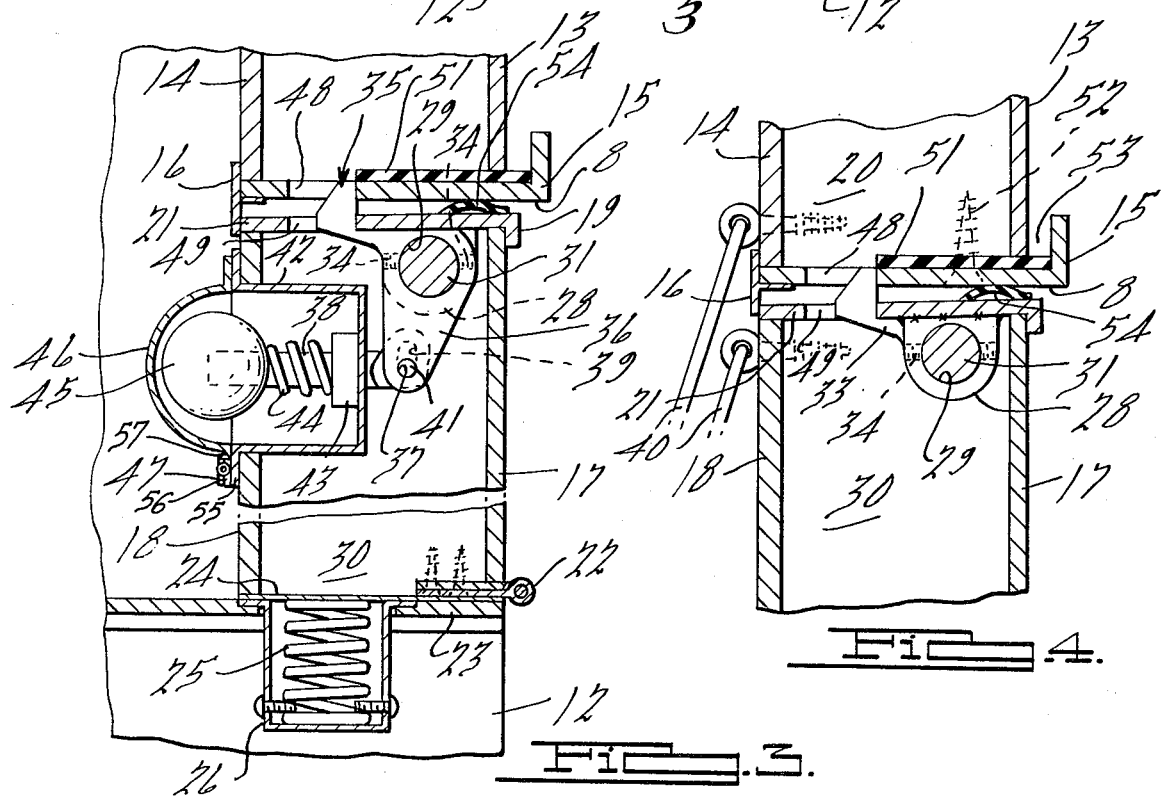
Fig. 3.
Fig. 4.

ESCAPE DOOR FOR TRAILER

BACKGROUND OF THE INVENTION

Trailers are usually constructed with a door near the front end so that the rear portion of the trailer is devoid of exit means. While the door permits the ingress and egress of occupants to the area within the trailer, they may become trapped in the area and cannot reach the door to leave the trailer interior. Reference may be had to U.S. Pat. No. 279,791 which discloses the closest art that was uncovered in a search on the invention.

SUMMARY OF THE INVENTION

The invention pertains to the provision of an opening in an old or new trailer through the floor, the side or rear wall in an area away from the trailer door to prevent an occupant from being trapped in the remote area. The opening and door are approximately seven feet long, 28 inches high and is hinged to the floor in a position to uncover the opening when escape is necessary. The door carries latching means as well as means for releasing the latching means so that by operating the latter the latching means is released and the door is open either by the weight of the occupant, by spring means or by both. The opening thus provided is large enough for an occupant to crawl or roll from the trailer interior to escape a fire, robbery, molestation and the like.

BRIEF DESCRIPTION OF THE DRAWING

FIG. 1 is an exterior end view of a trailer having an escape door therein which embodies features of the present invention;

FIG. 2 is a broken interior view of the escape door in the rear wall of the trailer illustrated in FIG. 1;

FIG. 3 is an enlarged sectional view of the structure illustrated in FIG. 2, taken on the line 3—3 thereof, and FIG. 4 is an enlarged broken sectional view of the structure illustrated in FIG. 2, taken on the line 4—4 thereof.

DESCRIPTION OF THE PREFERRED EMBODIMENT

A trailer 6 has an end wall 7 containing an opening 8 which is closed by an escape door 9. The trailer body is supported upon a chassis frame 11 herein illustrated as being composed of longitudinally extending eye beams 12 mounted on wheels (not shown) in a conventional manner. An exterior wall 13 is spaced from an interior wall 14 supported on framing 20 provided therebetween. A header and side plates 15 join the walls at the opening 8 with the inner end of the header and side plates provided with a T-shaped trim element 16. The door has an exterior wall 17 and an interior wall 18 mounted on framing 30 which are joined together at the top by a flanged plate 19 which is spaced from the header plate 15 to permit the inner end 21 to pass the outer edge thereof when the door is swung outwardly on a hinge 22 mounted along the bottom of the door and the floor 23 of the trailer. The bottom of the outer and inner door wall 17 and 18 are joined together by a plate 24 against which a plurality of springs 25 supported in cuplike elements 26 attached to the floor 23 force the door to open position when free to swing on the hinge 22. A chain, cable or the like 40 is provided at each top edge of the door to support it in horizontal position when the opening is in a wall.

A latch mechanism 27 is mounted along the underside of the upper edge of the door on spaced pairs of brackets 28 which are welded or otherwise secured to the underside of the plate 19. The brackets 28 have a cylindrical opening 29 therein through which a shaft 31 extends for rotary movement. The ends of the shaft extend beyond the two end pairs of brackets 28 and have an annular slot therein, each of which receives a spring ring 32 to retain the shaft in position. A latch finger 33 is secured to the shaft 31 between the pairs of end brackets 28 by set screws 34. A latching finger 35 between a central pair of brackets 28 has a biforcated operating arm 36 extending downwardly and provided with aligned apertures 37. An operating rod 38 has a slotted end 39 which receives a pin 41 which extends through the apertures 37 in the arm 36. The operating rod 38 extends through the bottom of a cuplike element 42, through a guiding washer 43 and a spring 44 with an operating ball 45 screwed on the extending end. A spring pressed closure cap 46 is secured by a hinge 47 to its flange and the flange 55 of the cuplike element 42 and is urged by a spring about the hinge pin to closed position, as illustrated in FIG. 3. An end 56 of the hinge 47 rests on the hinge part secured to the flange 55, the other spring end 57 resting on the flange of the cap 46. This prevents the accidental movement of the ball 45 inwardly to rotate the shaft 31 and release the door.

The plates 15 and 19 have aligned rectangular apertures 48 and 49 through which the end of the latching fingers 33 and 35 extend to engage the plate 15 and prevent the door from moving outwardly on the hinge 22. When the cap 46 is hinged outwardly to expose the ball 45 it can be pushed inwardly to rotate the shaft 31 counterclockwise to move the latching fingers 33 and 35 out of the apertures 48 and permit the springs 25 to swing the door outwardly on the hinge 22 to provide an opening through which an escape can be made. It will be noted that a rubber sealing strip 51 is disposed above the plate 15 when secured by screws 52 to the framing 20 providing an outer trough 53 along the top and sides of the opening 8 for collecting and expelling the water which may be delivered thereinto. A sealing strip 54 which may be of rubber, metal or the like seals the space between the door and the edge of the opening in the conventional manner. While the opening and door are shown at one end of the trailer, it is to be understood that it may be placed in the floor or in the side wall while following the construction herein illustrated and described.

I claim:

1. A closure element for a rectangular opening in the outer wall of a trailer body and located remote from the trailer door, plate means provided at the top and sides of the opening, hinge means along the longer horizontal bottom edge of the opening, a door member having plate means along the top and bottom with the bottom supported on the hinge means for movement between closed and open positions, said plate means at the top of said door having aligned openings, spaced inwardly extending apertured bracket means supported on said plate means at the top of the door member and extending toward said hinge means, a shaft rotatably supported in the apertures of the bracket means, a pair of latch means secured in fixed relation one at each end of said shaft for rotation therewith, latch means extending from the opening in the plate means on said door member into latching engagement with the plate means at the top of the opening, said shaft having a downwardly extending arm fixed thereto, an operating rod, and a pivot connecting said arm and rod for producing movement of said arm and rotation of said shaft in response to movement of said rod, a ball provided on the end of said rod, a cup having an open end surrounding said ball and rod, and a spring pressed cap for enclosing said cup end, spring means engaging said door member for resiliently biasing said door toward said open position when said latch means is released, and said plate at the top of said opening having a vertically extended flange spaced outwardly from the exterior surface of the outer wall to form a trough.

* * * * *